United States Patent
Pilkington et al.

(10) Patent No.: US 11,080,110 B2
(45) Date of Patent: Aug. 3, 2021

(54) IN-MEMORY STORAGE OF AGGREGATED DATA FOR REAL-TIME EVENT TRACKING

(71) Applicant: Experian Health, Inc., Franklin, TN (US)

(72) Inventors: Edmond Chase Pilkington, Arrington, TX (US); David Stephen Phoebus, Nashville, TN (US); Gregory Scott MacKenzie, Nashville, TN (US); Michael Peter Ochs, Franklin, TN (US); Jason Harrison Wallis, Spring Hill, TN (US); Kassandra Marie Kurth, Nashville, TN (US)

(73) Assignee: Experian Health, Inc., Franklin, TN (US)

( * ) Notice: Subject to any disclaimer, the term of this patent is extended or adjusted under 35 U.S.C. 154(b) by 270 days.

(21) Appl. No.: 15/917,970

(22) Filed: Mar. 12, 2018

(65) Prior Publication Data

US 2019/0108074 A1  Apr. 11, 2019

Related U.S. Application Data

(60) Provisional application No. 62/569,387, filed on Oct. 6, 2017.

(51) Int. Cl.
*G06F 9/54* (2006.01)
*G06F 7/08* (2006.01)
*G06F 3/0484* (2013.01)

(52) U.S. Cl.
CPC .......... *G06F 9/543* (2013.01); *G06F 3/04842* (2013.01); *G06F 7/08* (2013.01); *G06F 9/542* (2013.01); *G06F 9/544* (2013.01)

(58) Field of Classification Search
None
See application file for complete search history.

(56) References Cited

U.S. PATENT DOCUMENTS

| 8,510,807 B1 * | 8/2013 | Elazary | H04L 12/42 726/4 |
| 8,762,369 B2 * | 6/2014 | Macho | G06F 16/285 707/722 |

(Continued)

OTHER PUBLICATIONS

Krompass et al.; "Managing Long-Running Queries"; Mar. 2009; EDBT '09: Proceedings of the 12th International Conference on Extending Database Technology: Advances in Database Technology. (Year: 2009).*

*Primary Examiner* — Umut Onat
(74) *Attorney, Agent, or Firm* — Knobbe, Martens, Olson & Bear, LLP

(57) ABSTRACT

Aspects of the disclosure track and monitor automated system events, user-initiated events, and outcomes associated with system events and user-initiated events for providing real-time or near real-time measurements and insights. According to examples, a system is provided that is operative or configured to collect specific events and associated data associated with events that occur within various systems and products. The data is captured, aggregated, and stored in in-memory data storage. Accordingly, the data can be represented and displayed in a dashboard interface in real-time or near real-time. Accordingly, inefficient polling, long-running queries, and scheduled tasks can be eliminated.

18 Claims, 6 Drawing Sheets

(56) References Cited

U.S. PATENT DOCUMENTS

| | | | | |
|---|---|---|---|---|
| 9,529,923 | B1* | 12/2016 | Baird, III | G06F 16/182 |
| 9,928,108 | B1* | 3/2018 | Wagner | G06F 9/45533 |
| 10,462,004 | B2* | 10/2019 | Hsiao | G06F 3/04842 |
| 10,664,463 | B2* | 5/2020 | Ananthakrishnan | G06F 11/3006 |
| 10,740,332 | B2* | 8/2020 | Zhang | G06F 16/24542 |
| 2014/0095541 | A1* | 4/2014 | Herwadkar | G06F 16/313 707/774 |
| 2016/0062903 | A1* | 3/2016 | Gao | G06F 12/0891 711/133 |
| 2016/0231900 | A1* | 8/2016 | Meaney | G06F 3/04842 |
| 2018/0165349 | A1* | 6/2018 | Vaughan | G06F 7/08 |

* cited by examiner

IN-MEMORY STORAGE OF AGGREGATED DATA FOR REAL-TIME EVENT TRACKING

CROSS REFERENCE TO RELATED APPLICATIONS

This application claims the benefit of U.S. Provisional Application No. 62/569,387, having the title of "Real Time Product Utilization and User Activity Dashboard" and the filing date of Oct. 6, 2017, which is incorporated herein by reference in its entirety.

BACKGROUND

Highly distributed computing environments typically include hundreds if not thousands of physical and/or virtual server machines. Being able to track and monitor automated system events, user-initiated events, and their associated outcomes for providing measurements and insights typically requires expensive (e.g., long-running and poor performing) queries over vast amounts of data. In a typical environment, tracking and monitoring of such data experiences delays owing to the complexity of the systems, system events and the amount of data may make tracking impractical. Thus, interested parties may not be able to monitor various events until extended periods of time (e.g., days) after those events have occurred. Such delays are costly in terms of time, money and the ability to affect necessary system changes.

BRIEF SUMMARY

The present disclosure describes aspects of providing real time or near-real time product utilization, key performance indicators (KPIs), and user productivity across a platform and associated systems. Aspects of the disclosure track and monitor automated system events, user-initiated events, and outcomes associated with system events and user-initiated events for providing real time or near-real time measurements and insights. According to examples, a system is provided that is operative or configured to collect specific events and associated data associated with events that occur within various systems and products. The data is captured, aggregated, and stored in real time or near-real time. Accordingly, inefficient polling, long-running queries, and scheduled tasks can be eliminated. According to an aspect, the system is operative or configured to generate a dashboard user interface (UI) of the aggregated data for real time or near-real time display of product utilization data, KPIs, and system and user events. The data is further persisted for historical trending and analysis. According to another aspect, the system is further operative or configured to generate a UI that provides a real time or near real-time timeline of system events for enabling faster troubleshooting and issue resolutions.

This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention.

DETAILED DESCRIPTION

Figure 1A:
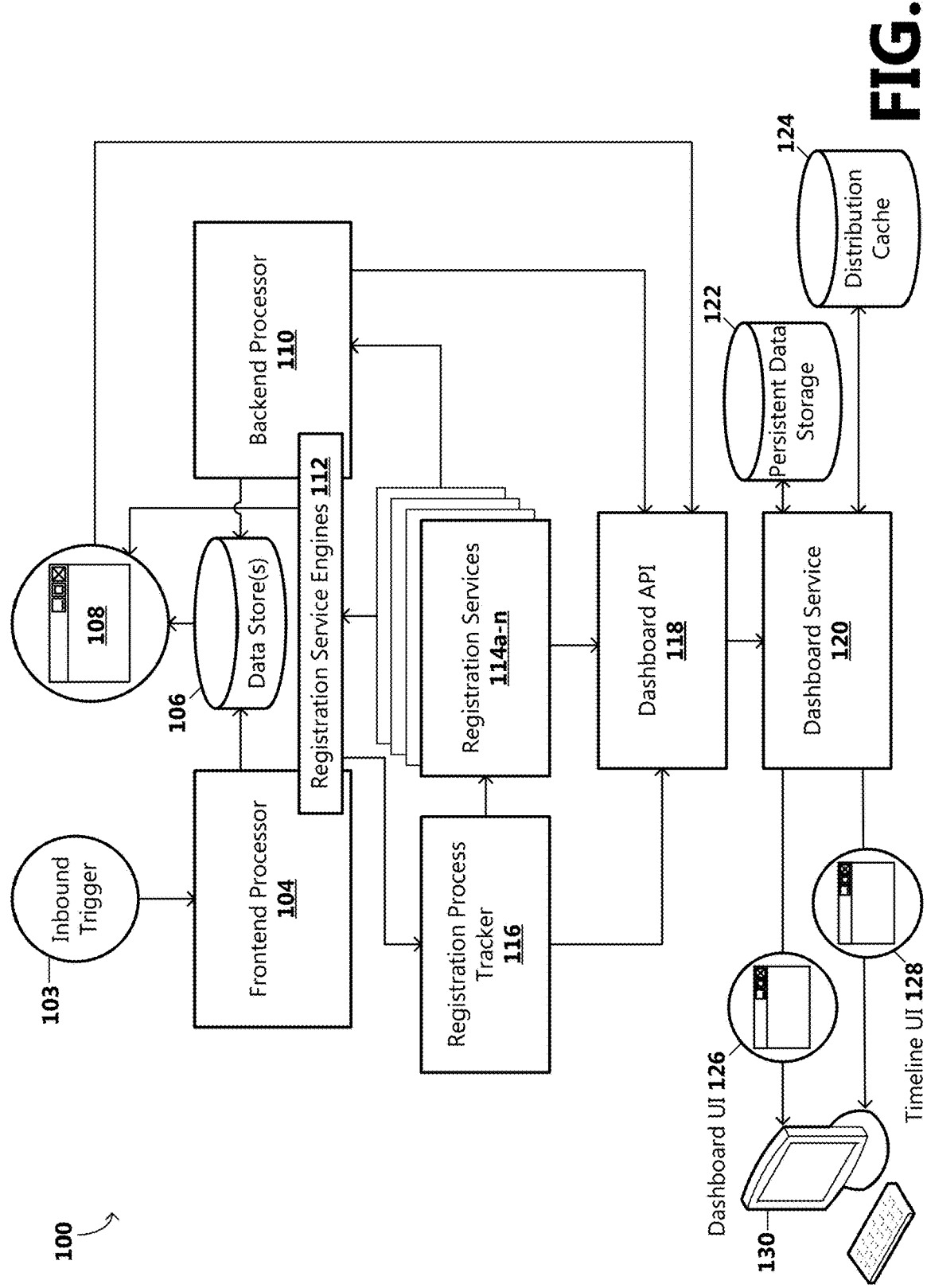
FIG. 1A is a block diagram that depicts a system for implementing aspects of the present disclosure.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications can be made to the elements illustrated in the drawings, and the methods described herein can be modified by substituting, reordering, subtracting, and/or adding operations to the disclosed methods. Accordingly, the following detailed description does not limit the present disclosure, but instead, the proper scope of the present disclosure is defined by the appended claims. The following detailed description is, therefore, not to be taken in a limiting sense.

FIG. 1A is a block diagram that depicts a system 100 that provides real-time or near-real time product utilization data, key performance indicators, and user productivity data, but is not so limited. As described further below, the system 100 includes a client 130 that operates in part to provide a user interface (UI) (e.g., dashboard UI 126 of FIG. 3) that displays a real-time or near real-time visual representation of product utilization, KPIs, and user productivity data and a UI (e.g., timeline UI 128 of FIG. 4) that displays a real-time or near real-time timeline of system events. As used herein, the terms "real-time" and "near real-time" are used to describe a level of computer responsiveness that a user can sense as virtually immediate to when the actual time at which an event takes place. For example, aspects of the system 100 enable processing and display of the information within milliseconds of when input data is received.

Client 130 of one embodiment comprises a browser or other web interface that enables client 130 to access, via network(s), a website provided by a server computer to display a variety of data described herein including a user interface (UI) (e.g., dashboard UI 126 of FIG. 3) that displays a real-time or near real-time visual representation of product utilization, KPIs, and user productivity data and a UI (e.g., timeline UI 128 of FIG. 4) that displays a real-time or near real-time timeline of system events.

As one implementation example, system 100 can be configured to monitor performance and/or other operational aspects of a transaction/message processing clearinghouse and/or other distributed/load-balanced computing environment that includes hundreds if not thousands of physical machines, each including dedicated processors, disks, flash memory, etc., which contribute to distributed processing operations. System 100 is extensible and can be used with different types of endpoint devices/systems. It will be appreciated that modern complex computer and communication architectures include a variety of hardware, software, and/or firmware that provide wired and/or wireless networked communication functionality to devices, systems, applications, etc.

Figure 1B:
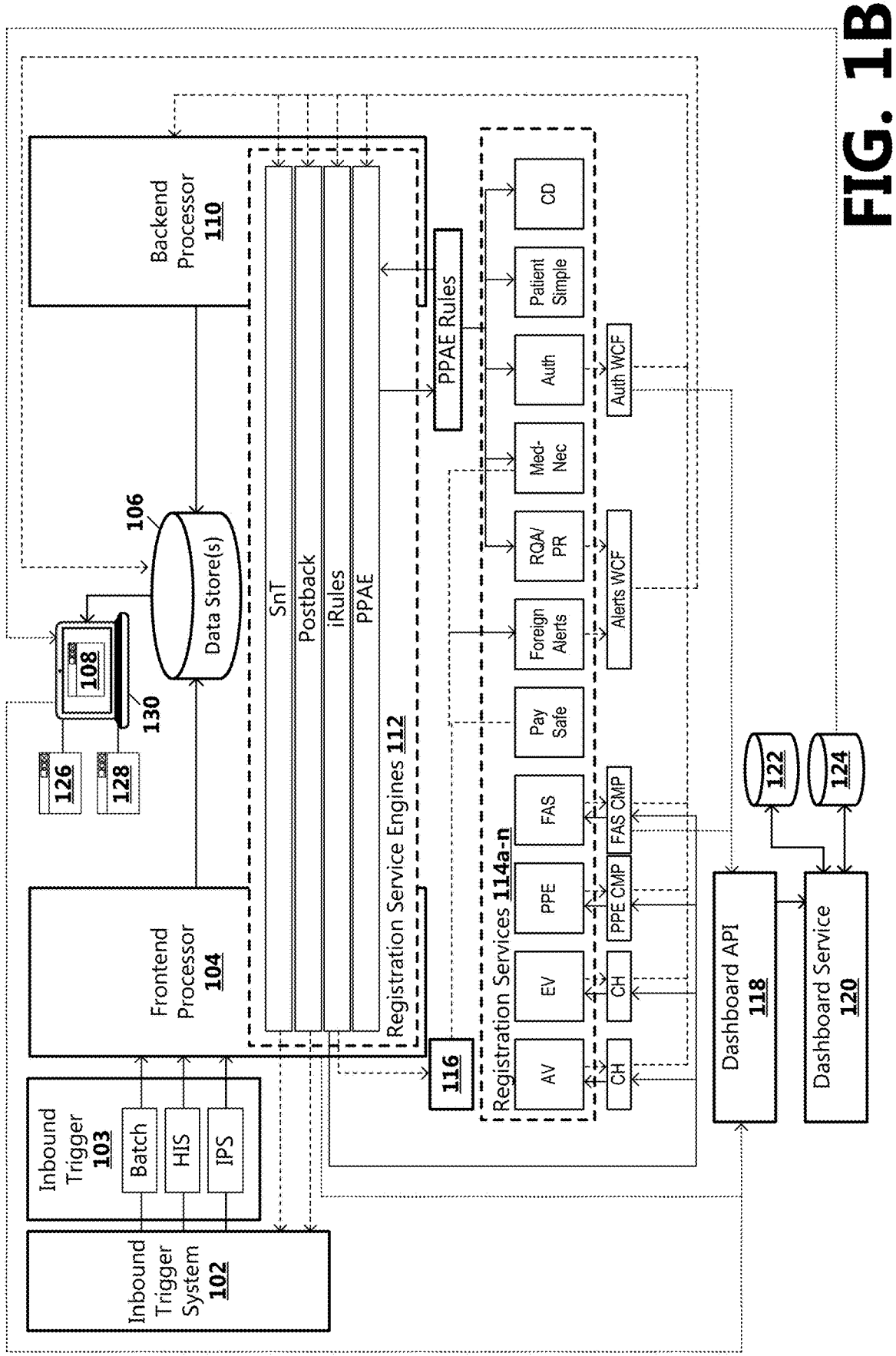
FIG. 1B is a block diagram that depicts an expanded implementation example of the system illustrated in FIG. 1A.

With continuing reference to FIG. 1A and to an expanded implementation example of the system 100 illustrated in FIG. 1B, system 100 includes an inbound trigger system 102 that can include various data messaging systems that can provide data to the system 100 that will be tracked and monitored as described herein. For example, as illustrated in FIG. 1B, the inbound trigger system 102 can include an information system, such as a healthcare information system (HIS) that is operative to provide messages, considered as data events or inbound triggers 103, to the system 100. In this example, the inbound triggers 103 are different types of messages that come from an HIS, but as should be understood, similar systems may be utilized as an inbound trigger system 102 for providing inbound data from any complex system for which data is to be tracked and monitored. Examples of inbound triggers 103 can include a batch of records for processing, healthcare or hospital information system files comprised of messages of standard or proprietary communication standard formats, etc. For example and with reference still to FIG. 1B, a batch represents any batch of records that are being processed and for which tracking and monitoring is desired. HIS is representative of health information that is stored and passed to the system 100 from a Healthcare or Hospital Information System as would be found in a health management system. For example, HIS information can comprise admissions, discharge, or transfer (ADT) data for a patient according to well-known formatting and protocol standards (e.g., HL7) and/or electronic data interchange standards (e.g., X12). Thus, a given batch file can include many ADT or X12 messages that are being passed to the system 100 as inbound triggers 103.

The frontend processor 104 (FEP) is a system that initially receives the inbound trigger 103 information. According to an aspect, the frontend processor 104 includes one or more rules for formatting inbound trigger 103 data for use by other components of the system 100. For example, the rules can include rules with which plain text messages are formatted into objects that can be automatically processed by other client 130 systems and components in the system 100.

The platform system 108 represents a system with which data received and processed according to one or more systems separate from or related to the system 100 can be viewed and utilized according to one or more user interfaces (UIs) and the like. For example, the platform system 108 can embody a platform that automates manual patient access processes, such as orders, registration, and financial clearance. According to an aspect, the dashboard UI 126 and the timeline UI 128 discussed below can be accessed, displayed and viewed via the platform system 108 by client 130.

The data stores 106 are representative of a variety of acceptable databases with which data processed by the frontend processor 104 and by other components of the system 100 can be stored for subsequent processing or for accessing and displaying via the UIs 126, 128.

The backend processor 110 is representative of a system through which transaction responses are passed for processing from the various components of the system 100. Data processed at the backend processor 110 can then be stored at the data stores 106 for use by other components of the system 100 or for accessing by users via one or more UIs 126, 128 as described herein.

The registration service engines 112 (represented in FIG. 1B as SnT, Postback, iRules, and PPAE), include example systems and or components for receiving, monitoring, and processing specific types of data. For example, the SnT registration service engine 112 (see FIG. 1B) is a scan and trigger system for monitoring patient account data, but as should be understood, can be used to monitor any type of customer or user data. According to one aspect, the SnT engine monitors data triggers and associated responses for associated accounts that need to be flagged for any type of subsequent processing.

The Postback engine 112 (see FIG. 1B) is representative of a system for sending data back to a registration system, for example, data going from the system 100 back to a third party patient, customer or user registration system.

The iRules registration service engine 112 (see FIG. 1B) includes one or more implementation rules, for example, rules that tell the system 100 whether to automatically run a transaction based on an inbound trigger 103 coming in from a client or based on a response received by the system 100 from a third party, such as a third party account payer. For example, if the system 100 receives a message (e.g., inbound trigger 103) from a client (e.g., inbound trigger system 102), the system can automatically run payment eligibility queries with a payer. The payer may then provide a response, which the system 100 can initiate a registration service engine 112, such as the iRules engine, to determine if another third party payer needs to be assigned to a patient, customer, or user account. For example, the first payer may respond with information indicating that a second payer should be associated with the account for account payment.

The PPAE registration service engine 112 (see FIG. 1B) represents a Post Processing Action Engine operative or configured to monitor various components of the system 100. According to an aspect, the PPAE registration service engine 112 monitors the frontend processor 104, the backend processor 110, one or a combination of the registration service engines 112, as well as processing performed by one or more components of the system 100, and triggers various PPAE rules for determining when the system 100 has finished processing a given account. For example, the various rules can correspond with subscriptions for each client such that when processing is complete, all the rules (or subscriptions) for a client are executed. As can be appreciated, the registration service engines 112 can be extended by adding and subscribing to new rules. The registration service engines 112 can determine processing is complete by monitoring the automated transactions ran for an individual patient, customer, or user account. In some examples, automated transactions are determined using another engine. When the system 100 receives an inbound trigger 103 from a client (e.g., inbound trigger system 102), the PPAE registration service engine 112 determines when the system 100 has received the last response from any transaction (e.g., by monitoring the total number of transactions initiated and when responses for each have been received) for determining when the end of processing is complete for a given account, and executes the rules.

The process tracker 116 and the associated registration services systems 114a-n are representative of a variety of different services (e.g., different software products for providing different types of data processing and analysis), that can process the various inbound triggers 103 received by the system 100 for tracking and monitoring as described herein. For example, referring to FIG. 1B, the registration services systems 114a-n are illustrated as individual boxes. The AV (Address Verification) system verifies a patient's, customer's, or user's address for determining whether the patient, customer, or user lives where he/she says he/she lives. That is, the AV system verifies received address information against other data available for the patient, customer or user. The EV (Eligibility Verification) system verifies whether the patient, customer, or user has payment coverage (e.g., insurance coverage) for a requested service. The PPE (Patient Payment Estimator) system determines any out-of-pocket expenses that will be the responsibility of the patient, customer, or user after payment is received form a third party payment source, such as insurance. The FAS (Financial Assistance Screening) application determines whether or not a patient, customer, or user qualifies for any type of charity or financial assistance for a requested service.

The Pay Safe (Payment Safe) system is a system that allows payments to be processed through one or more payment platforms such as credit card, check, money order, cash, etc. The Foreign Alerts system and the associated Registration Quality Assurance (RQA/PR) system determine the quality of the registration to make sure all the data has been entered properly, to ensure entered data matches data provided by a payer, a credit reporting agency, or other third-party system for a patient, customer, or user. For example, the Foreign Alerts system and RQA/PR system ensure each piece of received information complies with other information received for a patient, customer, or user.

The MedNec (Medical Necessity) system includes a system for determining whether a government payment source, such as Medicare, will cover a particular procedure. As should be appreciated, this system is representative of any system that can determine whether a government or other third party system may pay for a requested service of a patient, customer or user. The AUTH (Authorization) is representative of a pre-certification system that interacts with payers or insurance companies to determine authorization for payment for a requested service by a patient, customer, or user. Some services or procedures require authorization, and the payer determines whether or not they will cover the service or procedure before the service is rendered.

The Patient Simple system is representative of a patient, customer, or user-facing system for allowing the viewing and paying of bills for received services. The CD (Coverage Discovery) system is representative of a system for determining whether a self-paying patient, customer, or user has access to payment from one or more other sources.

Referring still to FIG. 1B, the smaller boxes below the above-described registration services 114a-n (labeled CH, PPE CMP, FAS CMP, Alerts WCF, and Auth WCF) are representative of one or more internal systems that interact with these above-described services for handling messaging into the various services. For example, systems illustrated as CH represent clearinghouses for address verification and clearinghouses for eligibility verification. The PPE CMP service is representative of a service that handles patient, customer, or user payment estimates. The FAS CMP system is representative of a service that handles financial assistance screening transactions. The Alerts WCF (Windows® Communication Foundation) system is representative of a system for handling all the registration alerts that are being generated. The Auth WCF system is representative of a system for handling services and payment authorization transactions.

Referring still to FIG. 1A and FIG. 1B, the dashboard API 118 represents an application programming interface that serves as an interface to and from the components of the system 100 described above for providing the functionality described herein. That is, each of the components described above interface with the dashboard service 120, described below, via the dashboard API 118. In some examples, the dashboard API 118 does not require prior knowledge of activities reported to the system. For example, the dashboard API 118 operates as a transport to pass messages of activities from the various registration services 114 to the dashboard service 120.

Referring still to FIG. 1A and FIG. 1B, as the system 100 receives messaging, for example, an HL7 message, or any type of data trigger from an entity (e.g., inbound trigger system 102) for which data is to be tracked or monitored (e.g., a hospital where the data trigger is from the hospital's registration system), the message is received by the frontend processor 104 as an inbound trigger 103 as described above. After the message and associated data is formatted as required, it can be passed to any of the services 114a-n for processing according to the programming of the service (e.g., payment eligibility, address verification). Each system receiving data is operative or configured to log into the dashboard API 118, and the information is transported to the dashboard service 120 via the API 118. Once the information is received by the dashboard service 120, the dashboard service 120 is operative or configured to store the received messages as raw data in the persistent data storage 122. For example, the event data in received messages can be persisted in the persistent data storage 122 for historical trending and analysis.

The dashboard service 120 is further operative or configured to take each data message as it is received, and to determine the nature of the activity (e.g., being reported in the message) and whether there is a particular data configuration for the specific activity associated with the data message. That is, since activity data is captured and aggregated at the moment or near the moment in which a system event occurs, aspects of the dashboard system 100 eliminate a need for expensive polling or long-running queries. If the data message has been defined, for example, patient registration, payment estimation, estimate collection amounts, etc., the dashboard service 120 aggregates the data provided in received messages according to a configuration that informs the dashboard service 120 how to aggregate the data. That is, the configuration of an activity defines how the data is aggregated for that particular activity. For example, when an estimate is ran for a given patient, customer, or user by a specific client user, the configuration can instruct the service to recalculate (or aggregate) the total average estimate amount for all estimates ran by that same client user. The configuration allows for the aggregation to be ingested and changed at run time. Further, the configuration allows for the aggregation to occur over one or more activities. For example, when an estimate is ran for a given patient, customer, or user by a specific client user and when a payment is collected for the same patient, customer, or user by the same client user, then the configuration of the estimate activity will cause the estimate data to be aggregated again (as in the previous example), and the configuration for the payment activity will cause the payment data to be aggregated in a similar way. That is, the average payment amount can be recalculated, and the configuration can instruct the service to recalculate a 'missed opportunity' value, wherein the 'missed opportunity' value is the total sum of the difference between an estimated amount and an amount that is actually collected. This 'missed opportunity' value can be tracked and can identify opportunities where a client user has missed opportunities to collect.

In some examples, the configuration is provided with a data message. In other examples, the dashboard service 120 maintains configurations associated with specific data types. In one example, if the message is associated with total account registrations, then the data will be configured by the service 114a-n from which it is received in a manner that tells the dashboard service 120 how to aggregate the data with similar data, for example, where the account registration data is added to other registration data with date/time stamp information so that total account registration data for various date/time ranges can be determined and presented. In addition, a determination is made as to the units associated with the data, for example, whether the data is in monetary data (e.g., dollars), temporal data (e.g., date/time of registrations), account data (e.g., names, addresses, service types), etc., such that the dashboard service 120 can aggregate the data according to units.

According to an aspect, as the message data is aggregated, the dashboard service 120 further stores the aggregated data in a distribution cache 124 at a user-level, wherein the distribution cache 124 is an in-memory data structure store that enables high write and read speed. That is, the distribution cache 124 stores data in memory, rather than on disk or on SSDs. By eliminating the need to access disks, the in-memory distribution cache 124 can access stored data with simpler algorithms that use fewer CPU instructions According to one example, typical operations may require less than a millisecond to execute. One example of a distribution cache 124 is REDIS. According to an aspect, the distribution cache 124 stores aggregated message data for subsequent display and presentation in the dashboard UI 126 and timeline UI 128. After data is stored at the user-level (and pre-sorted), it can then be queried by the dashboard service 120 for any necessary aggregation for display (e.g., averaging data, summing data).

According to an aspect, data stored in the distribution cache 124 are stored in a specific and configurable format and data structure. In various implementations, the cache is a key/value store and maintains a key for each activity that has occurred for each client user. For each activity that occurs in association with a specific client user, a key is created in the distribution cache 124 if it does not exist. The key's value is a sorted set data structure which uses a date/time stamp as the score for that particular sorted set entry. The score of the sorted set entry identifies the date/time the activity occurred. In various implementations, the date/time stamp is converted to UNIX date/time. The value of the sorted set entry is the relevant value for that activity (such as an estimate or payment dollar amount).

According to an aspect, aggregated data is stored in the distribution cache 124 for publication in the dashboard UI 126 for real-time or near real-time display. According to one aspect, data stored in the distribution cache 124 is stored for short periods, for example, no longer than 24 hours to keep the flow of data into and out of the cache 124 quick and nimble to allow for real-time or near real-time presentation of data in the dashboard UI 126. Thus, the system only keeps limited periods of data, for example, 24 hours of data, in memory and then, for each method that is being processed by the dashboard service 120, when that data is written into its location in memory, at the exact same time, any data that is in that dataset that is older than the limited period will be deleted to keep the distribution cache 124 lightweight and fast. For example, if the data is related to registrations, then according to a predetermined timetable (e.g., every minute, every 5 minutes, every hour, every 2 hours), the dashboard service 120 can pull the persisted data for aggregation. For example, if there is a desire to display the total registrations received by a hospital in the past 5 minutes, then the dashboard service 120 can pull the last 5 minutes of data, aggregate that data, and then publish the data in a UI (e.g., dashboard UI 126) as described below with respect to FIG. 3.

According to an aspect, when the dashboard service 120 processes a message and the data is stored in both the persistent data storage 122 and the distribution cache 124, as described above, only that data that will be presented in the dashboard UI 126 is stored in the distribution cache 124 for enabling fast performance. The dashboard UI 126 is a front-end interface in which activity data is distilled into insights using data visualizations. In some implementations, metrics such as a total number of account registrations, a number of touchless accounts, an average wait time, a measure of alert resolution accuracy, an average estimate amount, a measure of an amount collected from estimates, and a measure of missed opportunity amounts can be defined such that activity associated with the metrics can be collected and stored in the distribution cache 124. That is, the metrics configuration of an activity defines how the data is to be aggregated for the activity. From a data structure standpoint, the data stored in both places can be sorted and processed according to individual patient, customer, or user and according to the entity they are associated with, such as a particular hospital. Thus, when the dashboard service 120 processes a message, the dashboard service is operative or configured to process that message for a specific user at a specific entity (e.g., specific administrative person at a specific hospital) so that the system knows who the user is that sent the message. Therefore, if data aggregated for that specific user for that specific entity is presented and shows a trend or other issue that is inappropriate for any reason, then in real-time or near real-time, action (e.g., automated troubleshooting, manual troubleshooting, automated issue resolution, manual issue resolution) can be taken with respect to that user or account. In some examples, the output of the dashboard can be used to alert management that a specific threshold has been crossed for that user for that activity. For example, if a 'registration alerts' activity crosses a defined threshold of X, then the dashboard can alert a manager about the number of 'registration alerts' being generated by that user. Or, an estimate activity could be used to alert management that a specific user is failing to run estimates for patients that user is registering. As will be described below for the dashboard UI 126, a specific aggregation for a specific user for a specific entity can be presented for tracking and monitoring.

In terms of data storage at either of the storage units (i.e., persistent data storage 122, distribution cache 124), an identifier and associated score for the customer, patient, or other end user is kept in the set of data. According to one aspect, for a given piece of data, for example, a registration data item, the system gets the date and time, the moment that activity was reported, and when the system received that date and time. That date and time is converted into an integer value, and that value becomes the score. The system takes that score and the unique identifier for the associated customer, patient, or end user for which the data is received, and that information is added to the set of data (e.g., set of data for registrations, payment estimations) for that customer, patient, or end user. The data is aggregated and sorted by method, for example, registrations, payment estimations, etc. and by associated customer, patient, or end user, and the data as sorted and aggregated is stored for subsequent display in the dashboard UI 126, as described below. Thus, when the data then is called for display, it can be read out to the display in a very fast real-time or near real-time manner.

That is, because the data is in memory (i.e., distribution cache 124 already aggregated and sorted, it can be pulled and displayed very quickly in response to queries, as opposed to typical solutions that require long-running queries over vast amounts of data and thus are not real-time or near real-time.

In addition, the data is stored at the user level by a graphical object, and each graphical object contains a sorted set of customers, patients, or end users. In this case, graphical objects refer to the display functions associated with each type of aggregated and sorted data. For example, one graphical object can include aggregated registration data, another graphical object can include aggregated payment estimate data, another graphical object can include payment collection data, and so on. It then becomes efficient to show a dashboard UI 126 in the context of a single user, for example, a dashboard showing different types of data associated with a particular hospital administrative person responsible for processing incoming registrations, determining payment estimates, collecting estimated out-of-pocket costs from incoming registrants, and the like. That is, the system performs the required aggregation, counting of the data, as required, averaging of the data, as required, summing of the data, as required, or performance any other required functions so that information can be quickly displayed in the dashboard UI 126, as described below.

In addition, because of how the data is stored (i.e., already aggregated and sorted in the distribution cache 124), it becomes very efficient to roll data up to a department level so a user can see information in the dashboard UI 126 in the context of an entire department, for example, the Emergency Room Department or the Outpatient or Inpatient Registration departments, and the like. Further, the user can select to view information at a level higher (e.g., in the context of an entire facility), which can be provided quickly and efficiently in a dashboard UI 126. For example, the user can select to view information from a user level to a department level to an entire facility level, and there is no loss in performance because all the data is stored in memory (i.e., distributed cache 124) and presorted for presentation in the dashboard UI 126.

According to one aspect, the data is predefined for presentation in the UI so the system does not need to know all of the activities that are being reported to it in order to be able to track and monitor the data. The system 100 is a very open ended system and the method of storing and aggregating the data and storing the data as described above adds great efficiency to the system resulting in significant processing cost reduction, as well as, human and system cost savings attributed to quick real-time or near real-time display of data that allows for immediate attention to problem areas of a given business entity. For example, the dashboard UI 126 provides a single location for users to view and troubleshoot account processing, system events, outcomes, log files, etc. Further, the real time nature of the system allows for management to immediately course-correct any observed issues such as: a dramatic increase in processing time can indicate a system issue where patient eligibility is not being determined timely which can result in services being rendered that are not covered by insurance, or a significant decline in the amount of money being collected by users can indicate an issue with the payment processor or with hospital users not attempting to collect from patients. The likelihood of collecting money from a patient dramatically decreases after services have been rendered. Thus, it can be very important that a hospital have real time or near real time insight into how much money is being collected right now so that course correction can occur immediately without having to wait days for data to be imported into a reporting system where it is queried for the same result.

As should be appreciated, any of the components illustrated in FIGS. 1A and 1B can be implemented as single computing devices, such as single computer or processing/storage servers. Alternatively, any component may be implemented as a collection of devices such as a collection or farm of server computers. As used herein, the term "machine" refers to a physical article such as various endpoint systems and/or devices that use networked communication functionality to communicate and/or transfer data. Exemplary systems and/or devices can include physical server computers, server racks, desktop or laptop computers, tablets, network access devices, memory storage devices (e.g., disks, flash, solid state), etc. According to one functional implementation, a machine includes, but is not limited to, having a power supply, power control circuitry to control and regulate use of an external or internal power supply, processing and/or memory resources, such as a central processing unit, microprocessor, etc., advanced integrated circuitry, graphics processing hardware, networking hardware for wired and/or wireless configurations, an operating system, screen or display, I/O components, etc.

Figure 2:
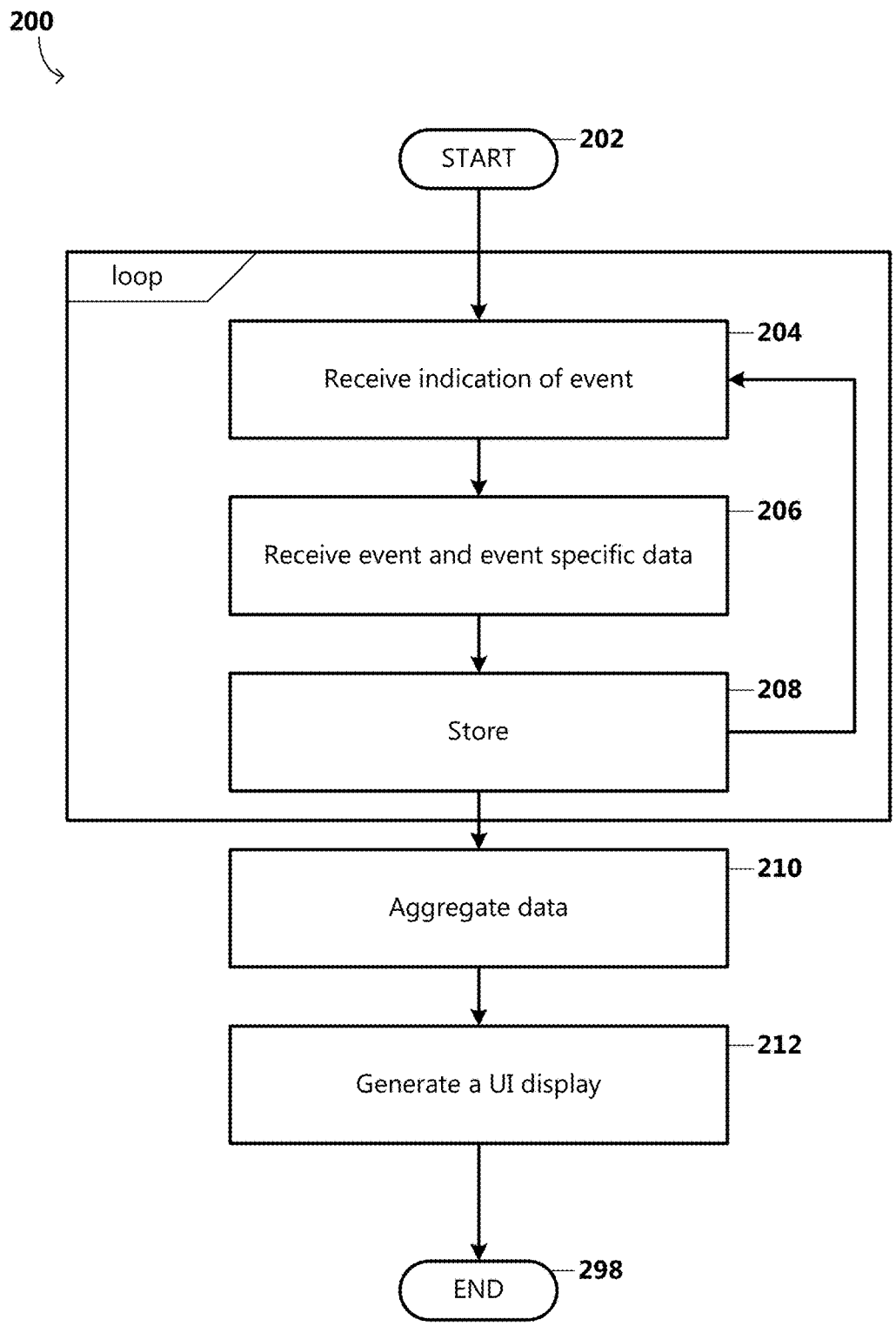
FIG. 2 is flow diagram that depicts an example method of providing real time or near-real time product utilization data, key performance indicators, and user productivity data.

FIG. 2 is flow diagram that depicts an example method of providing real time or near-real time product utilization data, key performance indicators, and user productivity data according to aspects of the present disclosure. For purposes of example, consider the process flow illustrated in FIG. 2 in terms of the aggregation, sorting, and display of information for total registrations received in a healthcare organization over a given time period. As should be understood, this is only one example process flow and is not limiting of aspects of the present disclosure.

Referring now to FIG. 2, the method 200 begins at start operation 202 and proceeds to operation 204 where a data event is received as an inbound trigger 103 at the frontend processor 104. For example, in the case of a healthcare example, consider that HIS data, for example, ADT (admit, discharge, transfer) data is received as an inbound trigger 103 because that data is received at a healthcare facility for a given customer or patient.

At operation 206, data for a specific event is received and passed to the frontend processor 104. At the frontend processor 104, the received data can be formatted, configured, or transformed for consumption by one or more services 114a-n, for example, a service that determines payment eligibility for incoming patients. In the case of a simple registration event, no processing by a service 114a-n may be required, and the data can be passed to the dashboard API 118 immediately upon receipt. On the other hand, if the type of event requires services of an appropriate service 114a-n, the event is processed by the service 114a-n and the resulting data is passed directly to the dashboard API 118. In either case, the data passed to the dashboard API 118 can include the specific activity identification for this type of registration. Thus, in real-time or near real-time, when the message for the event is received by the frontend processor 104, it is immediately processed, if required, by a service 114a-n, and then is reported to the dashboard API 118.

At operation 208, the dashboard service 120 stores the data in a data store at the persistent data storage 122. Simultaneously or in immediate sequence, at operation 210, the dashboard service 120 processes the data by aggregating and sorting the data according to a given parameter. For example, if the data is to be aggregated and sorted according to a given registration administrative person, then the dashboard service 120 aggregates and sorts the data according to an identification for the associated registration person.

When the data is aggregated and sorted, as described, it is immediately stored at the distribution cache 124 for displaying (operation 212) in a dashboard UI 126, as described below with respect to FIG. 3. As should be appreciated, in some cases the received data can be displayed immediately after receipt. For example, if the dashboard UI 126 is set to display registration information in real-time fashion, then the UI 126 will continually refresh with new data as it is received and processed. On the other hand, if the UI 126 is set to display new data every hour, then the newly received data can be maintained at the distribution cache 124 until the next scheduled data refresh cycle for the UI 126. So for example, the moment the registration user clicks save on that patient account in their registration system (e.g., inbound trigger system 102), the data can be fully processed and displayed in a very quick time, for example, in less than one second. Thus, an administrative person tasked with monitoring the progress of registrations for a single registration person, an entire department, or for an entire facility can have access to that information almost instantly as it is being received. The method 200 ends at operation 298.

Figure 3:
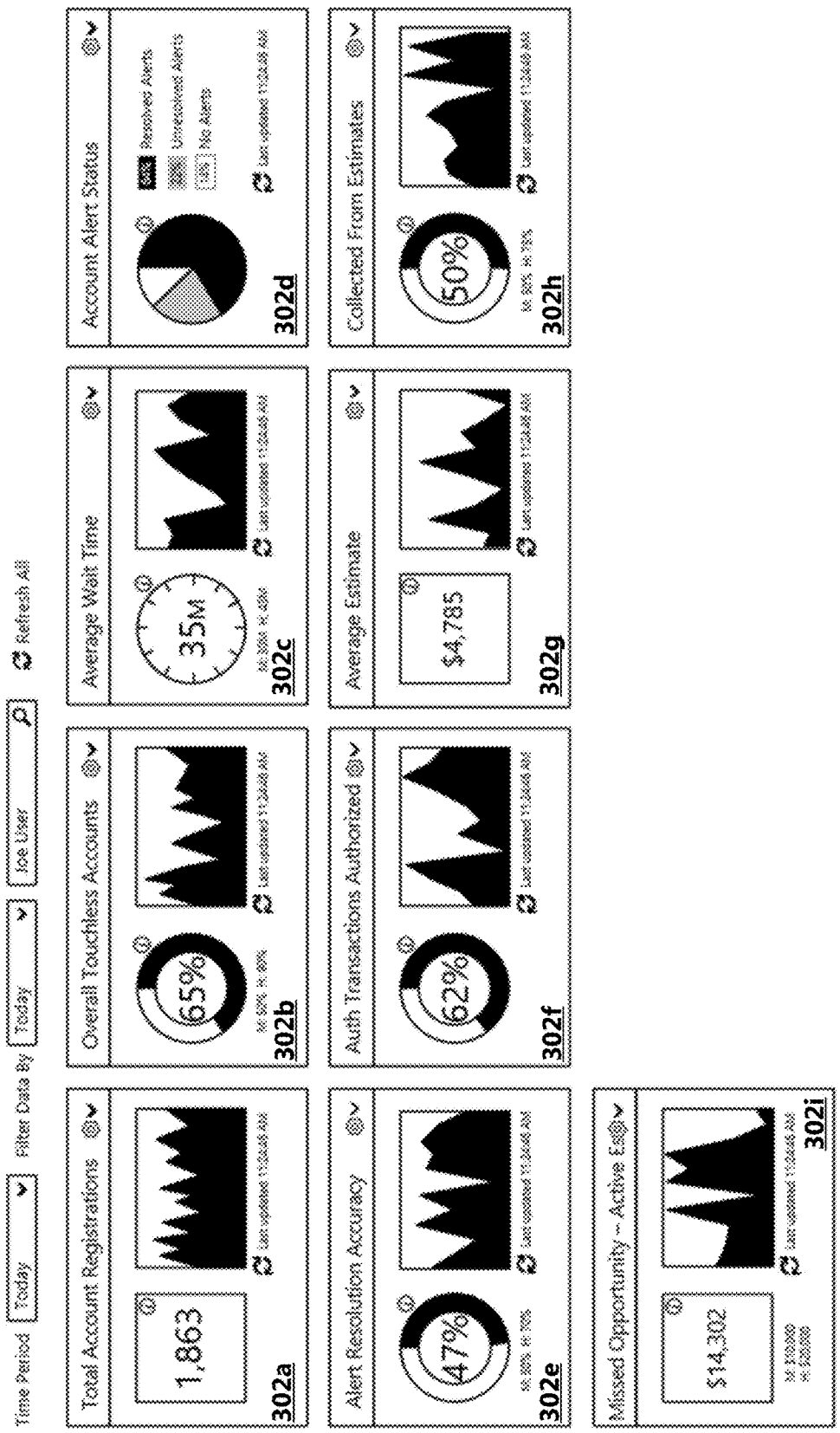
FIG. 3 depicts aspects of an exemplary dashboard user interface (UI) populated with graphical objects exposing real time or near-real time product utilization data, key performance indicators, and user productivity data.

FIG. 3 depicts aspects of an exemplary dashboard user interface (UI) 126 populated with graphical objects 302a-I (generally 302) for showing data that have been aggregated and sorted for different events as described above. Referring to FIG. 3, the dashboard UI 126 shows a number of graphical objects 302 in which data that have been processed, aggregated, sorted, and now displayed are illustrated. In each case, the data used to generate the graphical objects 302 have been pulled from the distribution cache 124 by the dashboard service 120. According to an aspect, when a user loads the dashboard UI 126, the dashboard service 120 determines what activities the loading user is authorized to see in the UI 126. As should be appreciated, based on the permissions associated with each user, different users may be able to see different levels of information. For each activity the loading user is authorized to see, the dashboard service 120 retrieves the necessary data from the distribution cache 124. According to an aspect, the process of determining user authorizations, retrieving the data, and publishing the data to the UI 126 can happen very quickly, for example, less than a millisecond.

For example and with reference to the example Total Account Registrations graphical object 302a, the dashboard service 120 retrieves a total number of registrations for a registration person or group of users (e.g., a department, a facility) being monitored and generates the graphical object for Total Account Registrations (e.g., Total Account Registrations graphical object 302a) as illustrated in FIG. 3. As should be appreciated, the information retrieved from the distribution cache 124 will vary depending on the parameters set by the requesting user, for example, all data for the past 5 minutes, 1 hour, 2 hours, and the like. The dashboard service 120 uses the score on the sorted data to set a starting point from which data will be retrieved to the end of the data set.

With reference now to the Overall Touchless Accounts graphical object 302b, the information displayed in the Overall Touchless Accounts graphical object ties back to information provided by the Registration Process Tracker 116. As can be appreciated, the steps for a registration process can vary greatly from one entity, e.g. hospital, to another. The Registration Process Tracker 116 enables the Registration Services 114a-n to define the steps that are required to complete a patient's registration process. Thus, the Overall Touchless Accounts graphical object 302b in the example dashboard UI 126 allows monitoring of the percentage of accounts where Registration Process Tracker 116 has checked off all the required registration events automatically, that is, where the user did not have to touch or interact with that account at all (i.e., there was no manual intervention for a user to complete any one of those steps).

In each of the example graphical objects 302, both graphical data and numbers are illustrated. For example, for the Total Account Registrations graphical object 302a, a graphical representation illustrates the up and down flow of registrations over a given time period and a number, for example, "1,863" shows an actual total number of registrations during the time period.

For the Overall Touchless Accounts graphical object 302b, a graphical representation is provided and a percentage of the number of accounts that utilized touchless processing within the given time period is shown. With reference to the Average Wait Time graphical object 302c, a graphical representation is provided and an average wait time for patients (e.g., 35 minutes) is shown. These and the graphical objects 302 illustrated in FIG. 3 are for purposes of example and are not limiting of an almost limitless number of types of data events that can be tracked and monitored as described herein.

According to aspects, the graphical objects 302 illustrated in the dashboard UI 126 are interactive objects in association with the dashboard service 120. That is, if a user changes a parameter, for example, a time period in which the data is to be illustrated, the dashboard service 120 will immediately retrieve the required data from the distribution cache 124, and the associated graphical object 302 will be updated. For another example, if a user zooms in on a given piece of information, for example, on a given piece of data, such as the average wait time on a particular day or at a particular hour as represented by the Average Wait Time graphical object 302c, likewise the dashboard service 120 will retrieve the requested data and update the Average Wait Time graphical object 302c. In some cases, as data changes according to a given threshold, the graphical nature of the graphical object 302 can be automatically changed. For example, referring to the Collected From Estimates graphical object 302h, if a desired amount of money collected from estimates is 75% or more, the collection percentage can be color-coded, for example, red for percentages below 25%, yellow for percentages between 25% and 75%, and green for percentages above 75%. Other example graphical objects that could be displayed include an Account Alert Status graphical object 302d, an Alert Resolution Accuracy graphical object 302e, and Auth Transactions Authorized graphical object 302f, an Average Estimate graphical object 302g, and a Missed Opportunity graphical object 302i. As should be understood, these are only example graphical objects and are not limiting of aspects of the present disclosure. In each example, the key is to provide the graphical objects 302 in the dashboard UI 126 and updates thereto in real-time or near real-time.

Figure 4:
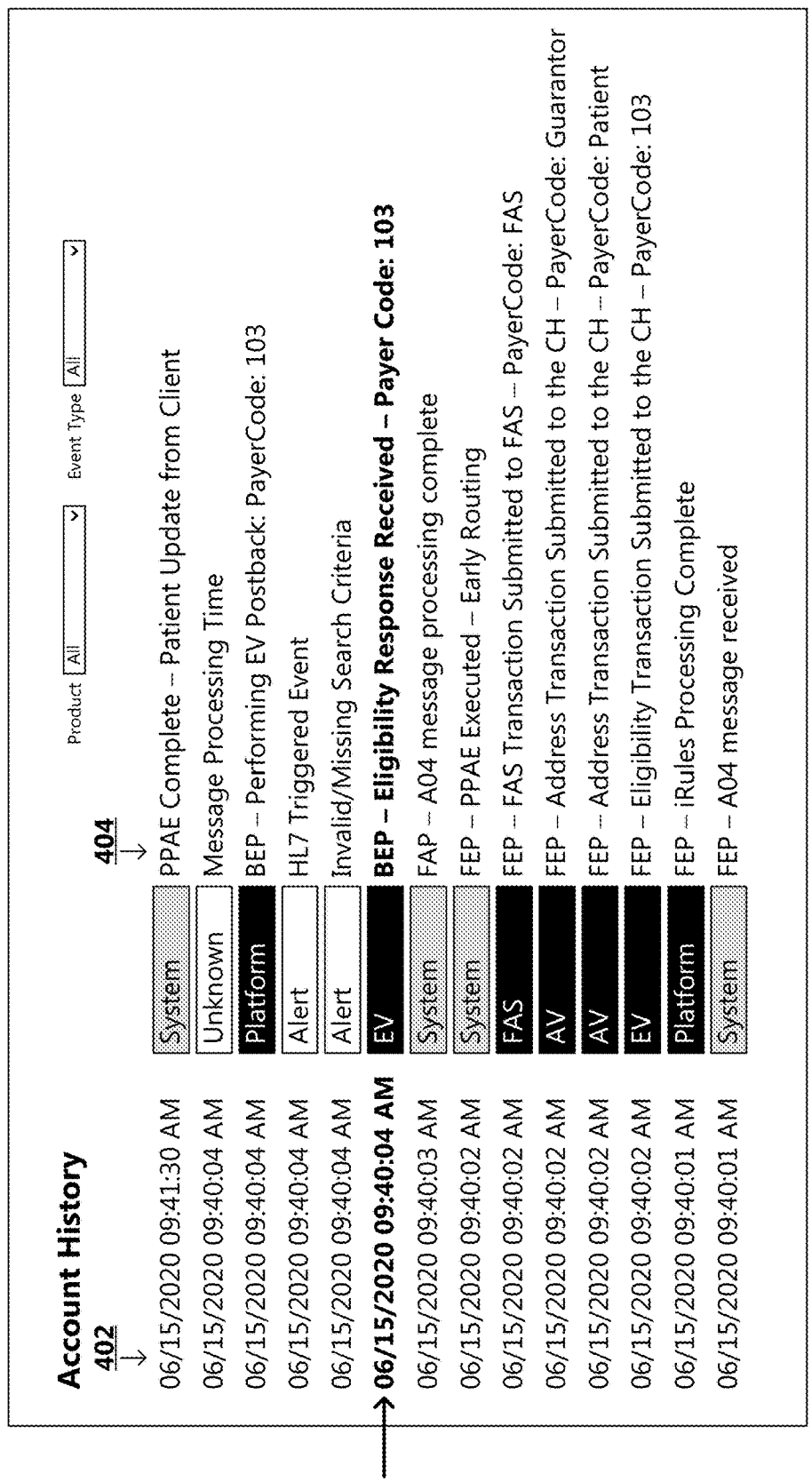
FIG. 4 depicts aspects of an exemplary timeline UI populated with a real time or near-real time timeline of system events.

FIG. 4 depicts aspects of an exemplary timeline UI 128 populated with a real-time or near real-time timeline 402 of system events 404. According to this timeline UI 128, an efficient identification of what happens with an account throughout the entire system 100 is illustrated. Thus, by collecting the data as described above, a timeline 402 of activities for various services 114a-n can be monitored. For example and with reference to the data in the sixth line down in the timeline UI 128, at June 15$^{th}$, 9:40 AM and four seconds, the data shows "BEP-Eligibility Response Received-Payer Code: 103." According to an example, this information is associated with one of the services 114a-n described above that determines eligibility of a given procedure for payment coverage (e.g., insurance coverage). For example, the information identifies that a response from an insurance company has been received by the backend processor 110 and the moment in time when the response was received by the EV registration service 114. With reference still to the example timeline UI 128, alerts, system or platform activities, and service-related events, such as responses from insurance companies for authorizations, pre-certifications, etc., that have come into the frontend processor 104 or backend processor 110 are also included. The data shown in FIG. 4 are for purposes of example only.

According to aspects then, when a customer calls an administrator of a given service being monitored by the system 100, for example, to check on why a particular service authorization did not occur, the timeline UI 128 can be utilized to quickly and efficiently find the transaction history associated with the requested information for tracking the event 404 based on the displayed timeline 402.

Figure 5:
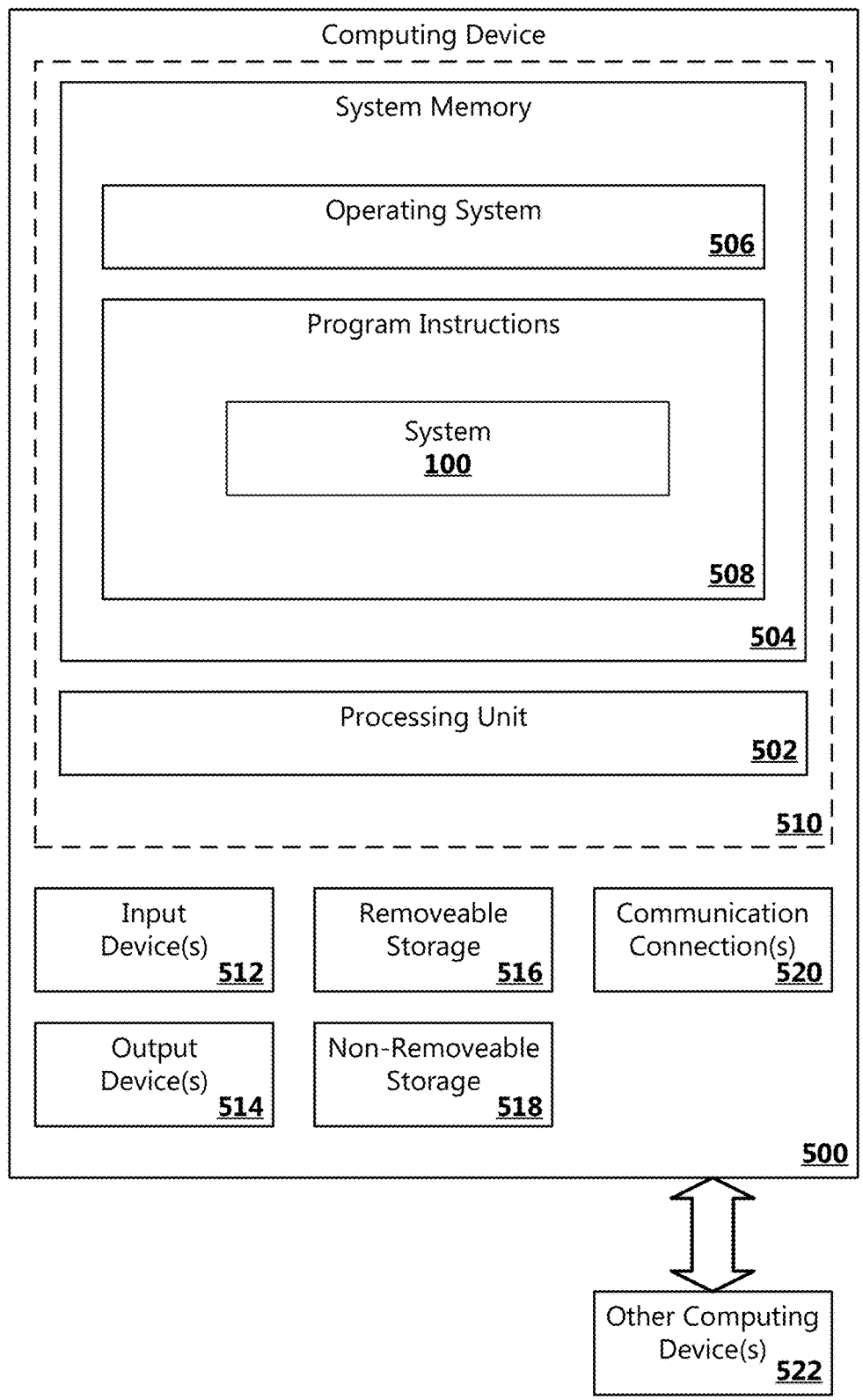
FIG. 5 is a block diagram illustrating physical components of an example computing device with which aspects may be practiced.

FIG. 5 is a block diagram illustrating physical components of an example computing device 500 with which aspects may be practiced. The computing device 500 can include at least one processing unit or processor 502 and a system memory 504. The system memory 504 may comprise, but is not limited to, volatile (e.g. random access memory (RAM)), non-volatile (e.g. read-only memory (ROM)), flash memory, or any combination thereof. System memory 504 can include operating system 506, one or more program instructions 508 including an automated executable having sufficient computer-executable instructions, which when executed, perform functionalities and features as described herein. For example, the one or more program instructions 508 can include one or more components of system 100.

Operating system 506, for example, can be suitable for controlling the operation of computing device 500 and for instantiating a communication session between one or more local or remote systems/devices. Furthermore, aspects may be practiced in conjunction with a graphics library, other operating systems, or any other application program and is not limited to any particular application or system. This basic configuration is illustrated by those components within a dashed line 510. Computing device 500 can also include one or more input device(s) 512 (keyboard, mouse, pen, touch input device, etc.) and one or more output device(s) 514 (e.g., display, speakers, a printer, etc.).

The computing device 500 can also include additional data or memory storage devices (removable or non-removable) such as, for example, magnetic disks, optical disks, caching data structures, tape, etc. Such additional storage is illustrated by a removable storage 516 and a non-removable storage 518. Computing device 500 can also contain a communication connection 520 that can allow computing device 500 to communicate with other computing devices 522, such as over a network in a distributed computing environment, for example, an intranet or the Internet. Communication connection 520 is one example of a communication medium, via which computer-readable transmission media (i.e., signals) may be propagated.

Programming modules can include routines, programs, components, data structures, and other types of structures that can perform particular tasks or that can implement particular abstract data types. Moreover, aspects can be practiced with other computer system configurations, including hand-held devices, multiprocessor systems, microprocessor-based or programmable user electronics, minicomputers, mainframe computers, and the like. Aspects can also be practiced in distributed computing environments where tasks are performed by remote processing devices that are linked through a communications network. In a distributed computing environment, programming modules can be located in both local and remote memory storage devices.

Furthermore, aspects can be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects can also be practiced using other technologies capable of performing logical operations such as, for example, AND, OR, and NOT, including, but not limited to, mechanical, optical, fluidic, and quantum technologies. In addition, aspects can be practiced within a general purpose computer or in other circuits or systems.

Aspects can be implemented as a computer process (method), a computing system, or as an article of manufacture, such as a computer program product or computer-readable storage medium. The computer program product can be a computer storage medium readable by a computer system and encoding a computer program of instructions for executing a computer process. Accordingly, hardware or software (including firmware, resident software, microcode, etc.) can provide aspects discussed herein. Aspects can take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects described herein may be used in various distributed computing environments where tasks are performed by remote processing devices that are linked through a communications network. Aspects described herein can be implemented via local and remote computing and data storage systems. Such memory storage and processing units can be implemented in a computing device. Any suitable combination of hardware, software, or firmware may be used to implement the memory storage and processing unit. For example, the memory storage and processing unit may be implemented with computing device 500 or any other computing devices 522, in combination with computing device 500, wherein functionality can be brought together over a network in a distributed computing environment, for example, an intranet or the Internet, to perform the functions as described herein. The systems, devices, and processors described herein are provided as examples; however, other systems, devices, and processors can comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way.

The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described can be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A system for providing real-time event tracking, the system comprising:
    at least one processing device;
    a distribution cache;
    a dashboard service coupled to the distribution cache; and
    at least one computer readable data storage device storing instructions that, when executed by the at least one processing device, cause the system to:
        receive an inbound data event;
        process the data event according to one or more data services;
        collect, from the one or more data services, activity data associated with the data event, the activity data indicative of an activity definition associated with the data event;
        define metrics and activity configuration associated with the activity data, the activity configuration provided with the inbound data event;
        aggregate and sort the activity data based at least in part on the metrics and the activity configuration associated with the activity data, the activity configuration indicative of how to aggregate the activity data for the activity associated with the data event;
        output the aggregated and sorted activity data to the distribution cache; and
        access the aggregated and sorted activity data in the distribution cache to generate a display of a graphical object representing real-time event tracking of the aggregated and sorted activity data in a dashboard user interface.

2. The system of claim 1, wherein the system is operative or configured to provide a dashboard service API for collecting the activity data from the one or more data services.

3. The system of claim 1, further operative or configured to store the aggregated and sorted activity data at a user level.

4. The system of claim 3, further operative or configured to:
    receive an indication of a selection to view user-level activity data associated with
    a specific user;
    retrieve the aggregated and sorted activity data associated with the specific user;
    and generate, in the dashboard user interface, the display of the graphical object, wherein the
    graphical object represents the aggregated and sorted activity data associated with the specific user.

5. The system of claim 4, further operative or configured to:
    receive an indication of a selection to view user-level activity data associated with a group of users;
    retrieve the aggregated and sorted activity data associated with each user of the group of users; and
    generate, in the dashboard user interface, the display of the graphical object, wherein the graphical object represents the aggregated and sorted activity data associated with the group of users.

6. The system of claim 1, further operative or configured to store the aggregated and sorted activity data for a predefined limited time period in the distribution cache.

7. The system of claim 1, wherein the configuration data defines how to aggregate and sort the activity data based on a unit type associated with the activity data.

8. The system of claim 1, wherein the system is further operative or configured to persist the received inbound data event on disk storage.

9. The system of claim 1, wherein the inbound data event includes one or more plain text messages comprising admissions, discharge, or transfer data.

10. The system of claim 1, further operative or configured to:
    receive a second inbound data event;
        process the second data event according to the one or more data services;
        collect, from the one or more data services, activity data associated with the second data event;
        define metrics associated with the second data event;
        utilize the dashboard service to aggregate and sort the activity data associated with the second data event based on the metrics defined for the data event and output the aggregated and sorted activity data associated with processing the second data event to the distribution cache; and
        access the aggregated and sorted activity data in the distribution cache to update, in real-time, the display of the graphical object to represent real-time event tracking of the aggregated and sorted activity data associated with processing the second data event.

11. The system of claim 1, wherein:
    the inbound data event is associated with a user account; and
    the system is further operative or configured to generate a timeline user interface for display, the timeline user interface comprising a real-time or near real-time timeline of system events associated with the user account.

12. A method for providing real-time event tracking, the method comprising:
    receiving an inbound data event;
    processing the data event according to one or more data services;
    collecting from the one or more data services, via a dashboard service API, activity data associated with the data event, the activity data indicative of an activity definition associated with the data event;
    defining metrics and activity configuration associated with the activity data, the activity configuration provided with the inbound data event;
    aggregating and sort the activity data based at least in part on the metrics and the activity configuration associated with the activity data, the activity configuration indicative of how to aggregate the activity data for the activity associated with the data event;

outputting the aggregated and sorted activity data to a distribution cache according to a user; and accessing the aggregated and sorted activity data in the distribution cache for generating a display of a graphical object representing real-time event tracking of the aggregated and sorted activity data in a dashboard user interface.

13. The method of claim 12, further comprising:
receiving an indication of a selection to view user-level activity data associated with a specific user;
retrieving the aggregated and sorted activity data associated with the specific user; and
generating, in the dashboard user interface, the display of the graphical object, wherein the graphical object represents real-time tracking of the aggregated and sorted activity data associated with the specific user.

14. The method of claim 13, further comprising:
receiving an indication of a selection to view user-level activity data associated with a group of users;
retrieving the aggregated and sorted activity data associated with each user of the group of users; and
generating, in the dashboard user interface, the display of the graphical object, wherein the graphical object represents real-time tracking of the aggregated and sorted activity data associated with the group of users.

15. The method of claim 12, further comprising storing the aggregated and sorted activity data for a predefined limited time period in the distribution cache.

16. The method of claim 12, further comprising:
receiving a second inbound data event;
processing the second data event according to the one or more data services;
collecting, from the one or more data services, activity data associated with the second data event;
defining metrics associated with the second data event;
utilize the dashboard service as part of aggregating and sorting the activity data associated with processing the second data event based on the metrics defined for the data event and outputting the aggregated and sorted activity data associated with the second data event to the distribution cache;
retrieving, from the distribution cache, the aggregated and sorted activity data associated with processing the second data event; and
updating, in real-time, the display of the graphical object to represent real-time event tracking of the aggregated and sorted activity data associated with processing the second data event.

17. The method of claim 12, further comprising generating a timeline user interface for display, the timeline user interface comprising a real-time or near real-time timeline of system events associated with a user account for which one or more inbound data events are associated.

18. A computer readable storage device including computer readable instructions, which when executed by a processing unit is operative or configured to:
receive an inbound data event;
process the data event according to one or more data services;
collect from the one or more data services, via a dashboard service API, activity data associated with the data event, the activity data indicative of an activity definition associated with the data event;
define metrics and activity configuration associated with the activity data, the activity configuration provided with the inbound data event;
aggregate and sort the activity data based at least in part on the metrics and the activity configuration associated with the activity data, the activity configuration indicative of how to aggregate the activity data for the activity associated with the data event;
output the aggregated and sorted activity data to a distribution cache according to a user level;
retrieve the aggregated and sorted activity data from the distribution cache; and
display a graphical object representing real-time event tracking of the aggregated and sorted activity data in a dashboard user interface.

* * * * *